(12) United States Patent
Carter et al.

(10) Patent No.: US 7,627,583 B2
(45) Date of Patent: Dec. 1, 2009

(54) METHODS, APPARATUS AND COMPUTER PROGRAMS FOR VISUALIZATION AND MANAGEMENT OF DATA ORGANISATION WITHIN A DATA PROCESSING SYSTEM

(75) Inventors: Marc S Carter, Southampton (GB); Lucas W Partridge, Southampton (GB); Graham D Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 10/697,895

(22) Filed: Oct. 30, 2003

(65) Prior Publication Data

US 2004/0267779 A1 Dec. 30, 2004

(30) Foreign Application Priority Data

Jun. 28, 2003 (GB) ................................. 0315191.7

(51) Int. Cl.
*G06F 7/00* (2006.01)
(52) U.S. Cl. ........................... 707/100; 707/2; 707/102; 707/3; 707/5; 707/6
(58) Field of Classification Search ................. 707/100, 707/3
See application file for complete search history.

(56) References Cited

U.S. PATENT DOCUMENTS

| | | | | |
|---|---|---|---|---|
| 6,442,545 | B1 * | 8/2002 | Feldman et al. ................. | 707/6 |
| 6,625,619 | B1 * | 9/2003 | McClendon et al. ..... | 707/104.1 |
| 6,636,849 | B1 * | 10/2003 | Tang et al. ...................... | 707/6 |
| 6,704,729 | B1 * | 3/2004 | Klein et al. ..................... | 707/5 |
| 6,804,662 | B1 * | 10/2004 | Annau et al. .................... | 707/2 |
| 7,117,207 | B1 * | 10/2006 | Kerschberg et al. ............. | 707/5 |
| 7,181,468 | B2 * | 2/2007 | Spring et al. ............. | 707/104.1 |
| 2002/0077962 | A1 * | 6/2002 | Donato et al. ................. | 705/37 |
| 2003/0050915 | A1 * | 3/2003 | Allemang et al. .............. | 707/1 |
| 2003/0120653 | A1 * | 6/2003 | Brady et al. .................... | 707/7 |
| 2003/0137531 | A1 * | 7/2003 | Katinsky et al. ............ | 345/716 |
| 2003/0177127 | A1 * | 9/2003 | Goodwin et al. .............. | 707/10 |
| 2004/0148155 | A1 * | 7/2004 | Vogel ............................ | 704/9 |
| 2004/0172612 | A1 * | 9/2004 | Kasravi et al. .............. | 717/101 |
| 2005/0010458 | A1 * | 1/2005 | Holloway et al. .............. | 705/7 |

(Continued)

*Primary Examiner*—Don Wong
*Assistant Examiner*—Binh V Ho
(74) *Attorney, Agent, or Firm*—Yee & Associates, P.C.; David A. Mims, Jr.

(57) ABSTRACT

Provided are methods, apparatus and computer programs for managing data organisation for computer programs. The method includes generating a reference taxonomy (information defining a first data organisation), accessing storage to obtain an application taxonomy (a second data organisation) for a computer program, and comparing the reference and application taxonomies to identify matching and non-matching features within the taxonomies. The results of the comparison can then be used to generate, in response to selection of a preferred taxonomy, a modified taxonomy to replace either the reference taxonomy or the application taxonomy. A GUI is provided to display the taxonomies and to facilitate user selections. A set of adapters provide access to the data storage of different programs and obtain taxonomy information for the different programs. A taxonomy engine compares taxonomies to identify differences and similarities, and can be used to generate an aggregate taxonomy. The method can be used to synchronize the organisation of stored data between a set of different computer programs, each of which may have different data structures and formats.

24 Claims, 7 Drawing Sheets

U.S. PATENT DOCUMENTS

| | | | |
|---|---|---|---|
| 2005/0055321 A1* | 3/2005 | Fratkina et al. | 706/45 |
| 2005/0192957 A1* | 9/2005 | Newbold | 707/5 |
| 2006/0090066 A1* | 4/2006 | Maze et al. | 713/156 |
| 2006/0173873 A1* | 8/2006 | Prompt et al. | 707/100 |
| 2006/0224683 A1* | 10/2006 | Briscoe et al. | 709/207 |
| 2007/0282918 A1* | 12/2007 | Holloway et al. | 707/200 |

* cited by examiner

METHODS, APPARATUS AND COMPUTER PROGRAMS FOR VISUALIZATION AND MANAGEMENT OF DATA ORGANISATION WITHIN A DATA PROCESSING SYSTEM

FIELD OF INVENTION

The present invention relates to visualization and/or management of the organisation of data within data processing systems.

BACKGROUND

Users of data processing systems receive or access information on various subjects, from a number of sources and in various formats. Users also generate or modify documents, images, and other types of information which are saved in local storage associated with the user's computer. This enables the user to view and modify the data without needing to be connected to the network. The different types of data are stored in various places on a user's computer system and are viewed and managed by a variety of application programs —each of which is best suited to one particular type of data. Users also work with data and applications which are distributed over two or more computer systems. The data or the applications, or both, may reside on a computer separate from the user's computer system.

Each of the data types is normally organised into its own hierarchical information space. The user creates a taxonomy of folders in which to store copies of e-mails. The user also generates a similar (but seldom identical) taxonomy for organising bookmarks in their chosen browser. Furthermore, the user divides their local drives into hierarchical directory/folder structures. All these structures were influenced by the user's mental model of how things are related, and it is frequently the case that each structure has some features in common with the other data structures that the user has created for other types of data. Nevertheless, the hierarchical data organisation is seldom (if ever) identical across multiple applications.

Maintaining these different types of data and organising the data that is received from the different applications is an onerous task, unless the different data can be organised in a consistent manner so that navigation and management is easier for the user. One approach to try and achieve consistency and hence reduce future workload is to attempt to unify all received data into one format and then access it using one particular application program. This approach of transforming data to a single format (which could be labelled as "coercion") would require parsing and transformation of most data feeds including data conversion. The coercion approach would present a significant processing overhead and would probably run into conversion problems.

It is also known to "federate" various data sources, so that they appear to be one (logical) data source. Federation is a technique which is used with multiple data sources which differ slightly in terms of detailed representation but not in terms of gross characteristics. Heterogeneous database management systems are a good example of such sources. Federation can be achieved by interposing an additional layer of abstraction between the physical data and one application program which is used to view and manage it. However, the addition of this extra level of abstraction adds undesirable complexity and processing to the user's computer system and could suffer from similar problems to those that afflict the coercion approach. Furthermore, automated federation typically combines independent data sources without taking account of similarities between each source's data organisation.

Both of the previous approaches suffer from the problem that new or modified data formats and advances in the application programs normally used to manipulate each type of data are unlikely to be readily available in either a coerced or a federated system. For these reasons, it remains preferable to use the "native" application program for each type of information. (Examples of 'application programs' in this context are Microsoft's Internet Explorer or Netscape's Navigator for Web browsing, Microsoft® Outlook for e-mail, or Lotus Notes® software for e-mail and data management. Lotus Notes is a trademark of International Business Machines Corporation, Microsoft is a trademark of Microsoft Corporation in the United States, other countries, or both.)

There exists a need for a solution which simplifies the management of data by providing consistency of data organisation for different data types, without the disadvantages of known coerced or federated approaches.

SUMMARY

A first aspect of the present invention provides a method for managing data organisation for computer programs, the method including the steps of: generating and storing a reference taxonomy, the reference taxonomy comprising information defining a data organisation; accessing storage associated with a computer program to obtain an application taxonomy, the application taxonomy comprising information defining the organisation of stored data items of the program; comparing the reference taxonomy with the application taxonomy to identify matching and non-matching features of the compared taxonomies; and in response to a selection of a preferred taxonomy, storing the preferred taxonomy as a replacement of at least one of the reference taxonomy and the application taxonomy.

The term 'taxonomy' is used in this description to refer to a data organisation, such as an hierarchical organisation of files, folders and directories, or an organisation of bookmarks. A generated reference taxonomy can be used to help a computer user to identify and understand the logical relationships between existing data structures for a set of managed programs. In preferred embodiments, the reference taxonomy can be updated in response to differences between the reference taxonomy and an application taxonomy, and the reference taxonomy can be used to modify existing application data organisations —as described below.

In a first embodiment, the generation of the reference taxonomy preferably involves accessing storage associated with an additional program to obtain an application taxonomy for the second program, and a user then selecting the application taxonomy of the second program as a reference taxonomy. The user is able to select, from a number of different taxonomies, a taxonomy that most closely resembles the user's mental model of how subject areas are related.

In an alternative embodiment, the reference taxonomy is a user-defined data organisation created using a graphical user interface (GUI) of a data organisation manager program. The data organisation may combine user selected features (e.g. nodes and/or links) of existing taxonomies and user created features. The user-created reference taxonomy is then compared with existing application taxonomies to identify similarities and differences.

The method according to a preferred embodiment includes the step of generating a modified reference taxonomy which aggregates features of the initial reference taxonomy and the compared application taxonomy, wherein one or more identified matching data structures are represented as a single node in the modified reference taxonomy. The modified reference taxonomy is preferably generated as a candidate reference taxonomy which is presented to a user for the user to reject, accept or partially accept. An accepted candidate reference taxonomy, or the accepted parts, are then stored as an updated reference taxonomy.

In one embodiment of the invention, the reference taxonomy is used to modify an application taxonomy—adding new data structures corresponding to features of the reference taxonomy, and/or moving, deleting or modifying relationships between data structures of the application taxonomy. The modified application taxonomy is saved to storage associated with an application program. In this way, the user is able to increase the consistency between their preferred reference model of how data should be organised and the application taxonomy or several of them. This can be implemented as an automated or semi-automated synchronization of taxonomies. An example is where a user creates a folder in a Lotus Notes database, and a matching node is added automatically to the reference taxonomy; this creation of a node within the reference taxonomy can be used to trigger automatic generation of corresponding data structures within other applications data storage—such as a Windows file system folder corresponding to the Lotus Notes folder. This provides the user with an appropriate Windows folder to store any attachments received within e-mails that are stored in the new Lotus Notes folder. Different levels of automation can be provided for, and controlled via configuration settings.

The step of comparing taxonomies preferably uses string matching techniques to identify matching node names (where a named node within an application taxonomy represents a specific data structure), and preferably compares qualified names representative of node names and relationships between nodes within a taxonomy to identify nodes having both matching names and relationships to other named nodes. For example, a reference taxonomy and an application taxonomy may both contain a node whose path is "/computing/scientific/molecular modelling".

Each application taxonomy is preferably obtained by means of an adapter for the respective computer program. Use of a set of adapters for accessing data storage for application programs having different data structures and data formats, together with a generic computer program which interfaces to the adapters, provides an extensible solution since new adapters can be added to support additional programs as required. The organisational data obtained for a computer program is preferably converted to a generic format when required (such as XML), before being compared with the reference taxonomy. This enables taxonomies for applications having different data types and formats to be compared. Each taxonomy is preferably displayed to a user via a GUI. The GUI preferably enables user selection of a preferred taxonomy and/or preferred features (nodes and links). The GUI preferably also enables the user to create new nodes and links within a reference taxonomy.

A first embodiment of the invention provides a method for both visualizing and modifying the organisation of hierarchically organised sets of data structures. The method enables a user of a data processing apparatus to increase consistency between the organisation of data structures for various types of data, associated with different programs within the apparatus. The organisation of a set of information spaces that correspond to different data types is managed to provide increased consistency between the different organisational structures, simplifying or automating subsequent management of data storage and navigation (i.e. locating data via paths through the organisational structures).

The invention is beneficial where the data items associated with each of a set of different programs all conform to some extent to a common hierarchical organisation. Similarities and differences between the hierarchical organisations are identified and the user is prompted to modify the hierarchies if required. In preferred embodiments, certain differences can be disregarded when comparing two hierarchies (e.g. by specifying exceptions). An example where this is likely to be useful is where some elements of a particular data taxonomy are only relevant to a subset of the data types or a single application program.

Methods and systems according to preferred embodiments of the invention are able to handle data in its native formats using the native application program of choice for each data type.

Preferred solutions enable definitions of data structures to be automatically or semi-automatically gleaned from existing data storage structures and then compared, by processes running in a computer. The data structures can then be modified in response to user interactions with a graphical user interface. Further automation of the step of modifying a data organisation is also possible.

Methods as described above may be implemented in computer program code, designed to control the performance of operations in a data processing apparatus on which the program code executes, and the program code may be made available for electronic transfer or recorded on a recording medium.

Further aspects of the present invention provide a data processing apparatus including: a data processor; data storage; one or more computer programs for controlling the operation of the data processor to perform operations on data items stored in the data storage; and a taxonomy manager for managing organisation of stored data in association with the one or more computer programs, in accordance with one or more of the methods described above.

BRIEF DESCRIPTION OF DRAWINGS

Embodiments of the invention are described in detail below, by way of example, with reference to the accompanying drawings in which.

DETAILED DESCRIPTION OF EMBODIMENTS

System Overview

Figure 1:
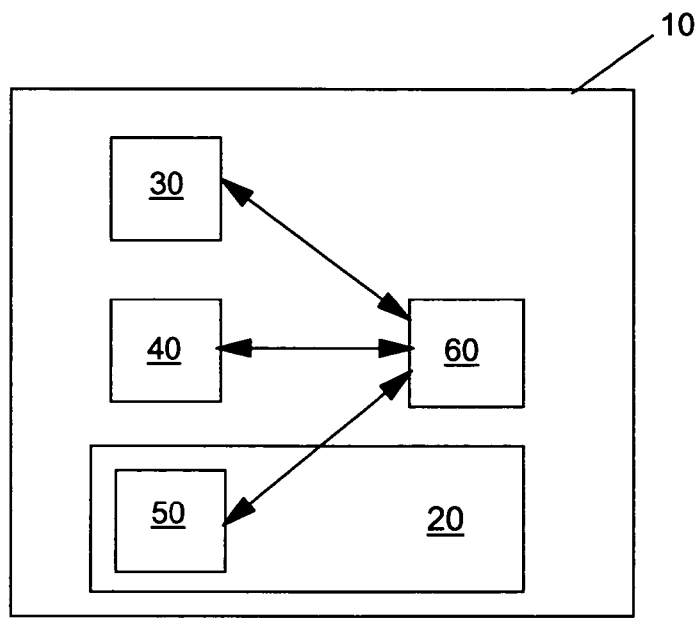
FIG. 1 shows, schematically, a data processing apparatus with a number of different applications running on the system.

FIG. 1 shows, schematically, an example data processing apparatus 10. The example apparatus may be a portable data processing device such as a PDA or laptop computer, a desktop PC, or any other computer system or a group of computers interconnected within a network.

The data processing apparatus typically runs several different computer programs, such as an operating system 20, an e-mail program 30, a Web Browser 40, a word processor, etc. The data processing apparatus has a number of separate data storage structures associated with the different programs, such as files, folders and database tables. The corresponding different types of data are saved into the appropriate data storage structure by a user. Copies of e-mails can be stored into an hierarchical set of folders within an e-mail program, and bookmarks containing URLs for accessing Web pages can be organised into hierarchical folders within a Web Browser program. Similarly, the computer's local drives can be divided into directories and folders containing document and image files, managed by the operating system's file system 50.

Each desktop program has its own hierarchy of folders or directories in which the various files and bookmarks are stored. Each of these hierarchies is known as an application taxonomy. There are often some similarities between the different application taxonomies, since the user-created hierarchies each reflect the user's personal view of how stored data items are related. However, there are typically also many differences between the various hierarchical data structures, and these differences add complexity to tasks such as navigation and management of stored data.

An embodiment of the invention is described below as a set of computer program components which cooperate to control the performance of operations of a data processing apparatus when loaded and executed on the apparatus. It will be apparent to a person skilled in the art that the individual steps of the method described below can be implemented in computer program code and that a variety of programming languages and coding implementations may be used to implement the methods described herein. Moreover, the computer program is not intended to be limited to the specific control flow described below and one or more of the steps of the computer program may be performed in parallel rather than sequentially as described. One or more of the operations described in the context of a computer-program-controlled implementation could alternatively be implemented as a hardware electronics component.

The computer program components may be stored on any computer readable medium, including storage devices such as magnetic or optical disks, memory chips, or other storage devices suitable for interfacing with a general purpose computer. The computer readable medium may also include a hard-wired communication medium such as exemplified in the Internet system, or wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

Taxonomy Manager

A taxonomy manager computer program 60 is installed on the data processing apparatus. The word 'taxonomy' as used in the present specification refers to an organisation of data items. The taxonomy manager 60 helps the user to understand his or her own data organisation, by means of a graphical user interface (GUI), and allows management of data storage structures to increase the consistency between the separate application taxonomies associated with a number of the programs running on the apparatus.

Figure 2:
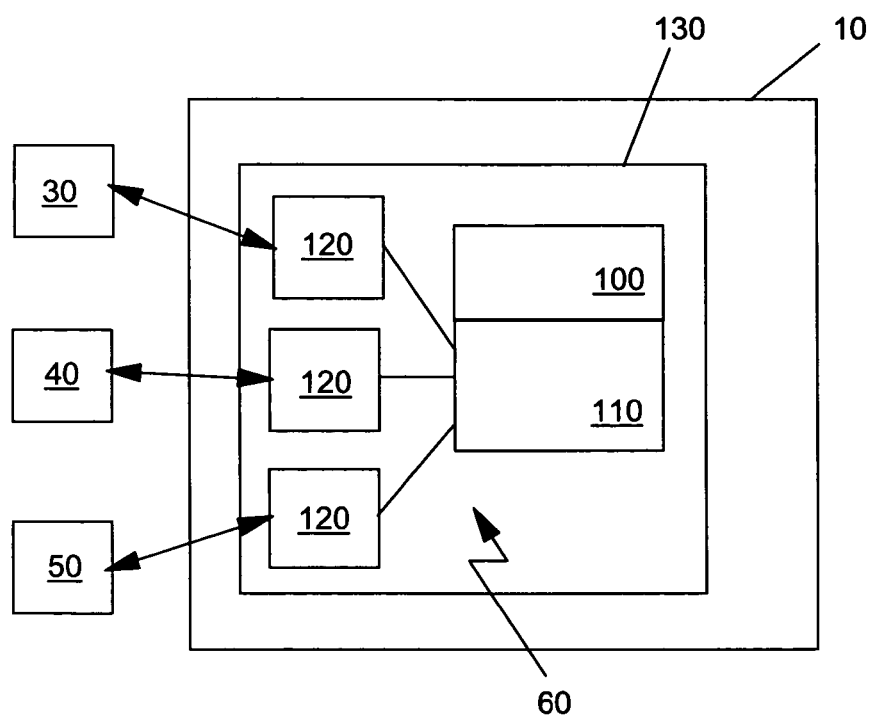
FIG. 2 shows components of a taxonomy manager program cooperating with a set of application programs according to an embodiment of the invention.

Referring to FIG. 2, the taxonomy manager program 60 comprises a graphical user interface (GUI) 100, a taxonomy engine 110, and a set of adapters 120—each implemented as a program component written in the Java™ programming language and running within a Java Virtual Machine 130 on the apparatus 10. Implementing the taxonomy manager 60 as a set of Java components 100,110,120 provides efficient interaction between the components and provides portability of the solution to other environments. Provision of a set of adapters 120 and a generic taxonomy engine 110 allows the solution to be extended to additional data formats over time by development and installation of an appropriate adapter, often without the necessity for change of the taxonomy engine. The operation of each of the components 100,110, 120 of the taxonomy manager 60 is described in detail below with reference to FIGS. 3-7. It will be clear to persons skilled in the art that other solution architectures, as well as other programming languages, may be employed within the scope of the invention. (Java and all Java-based trademarks and logos are trademarks of Sun Microsystems, Inc. in the United States, other countries, or both.)

Adapters

The set of adapters 120 allow the taxonomy manager 60 to read and initiate creation of data structures—such as folders in a Windows operating system's file system or Unix® directories. Other adapters enable reading and creation of data structures used within e-mail and database programs (for example, Lotus Notes information management and communication program from Lotus Development Corporation, or Outlook Express communication software from Microsoft Corporation) or within Web Browser programs (such as Microsoft's Internet Explorer or Netscape's Navigator). The adapters 120 are plug-ins to the taxonomy engine 110 and can be used to traverse directories or other data structures to extract (210 in FIG. 6A) organisational information for the data structures that the applications 30,40,50 are using, and then to pass this information on to the taxonomy engine. (UNIX is a registered trademark of The Open Group in the United States and other countries.)

In general, a different adapter is used for each different operating system or application program, since different file formats and application programming interfaces (APIS) are used by the various programs. Example data structures include the Internet Explorer "Favourites" folder and Unix operating system directories, and an example data format is Lotus Notes database format.

Relatively simple adapters are used to read file and folder names and organisational information for a file-system-based structure (such as Windows file system folders and directories). Since the hierarchical data structure is necessarily available to applications interacting with the operating system, known interfaces can be used or known parsing techniques can be applied to access the organisation information. For example, the WIN32 API can be used to browse the directory structure within a Windows operating system. Since bookmark folders used by a Web Browser are simply XML files within a directory, the adapter used for a Web Browser incorporates an XML parser which can identify mark-up tags indicating certain types of data structure.

For certain other applications, such as a database or e-mail program, the adapter needs to access folder structures within the application. Adapters for such applications are written with an implementation of product-specific APIs or an ability to interpret product-specific data formats, to access information regarding the internal data structures of each application. For example, a database client program can be used to access database tables within a relational database, and a Lotus Notes client program can be used to access database folders used by the Lotus Notes program.

The storing of data structures, and management of stored data structures, by relevant applications and operating system file systems is well understood by persons skilled in the art and so will not be described in detail herein.

Figure 6A:
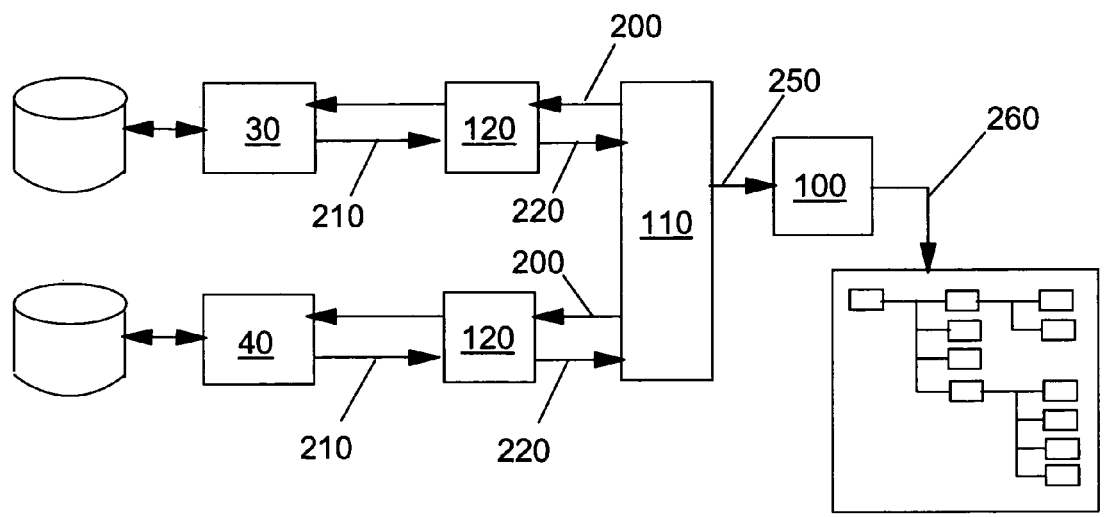
FIGS. 6A and 6B show the flow of data between the components and programs of FIG. 2 during operation of the taxonomy manager in accordance with an embodiment of the invention.
Figure 6B:
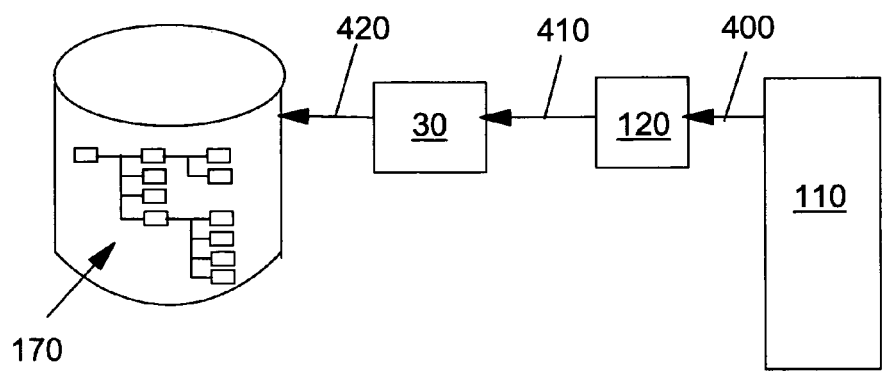
Figure 7:
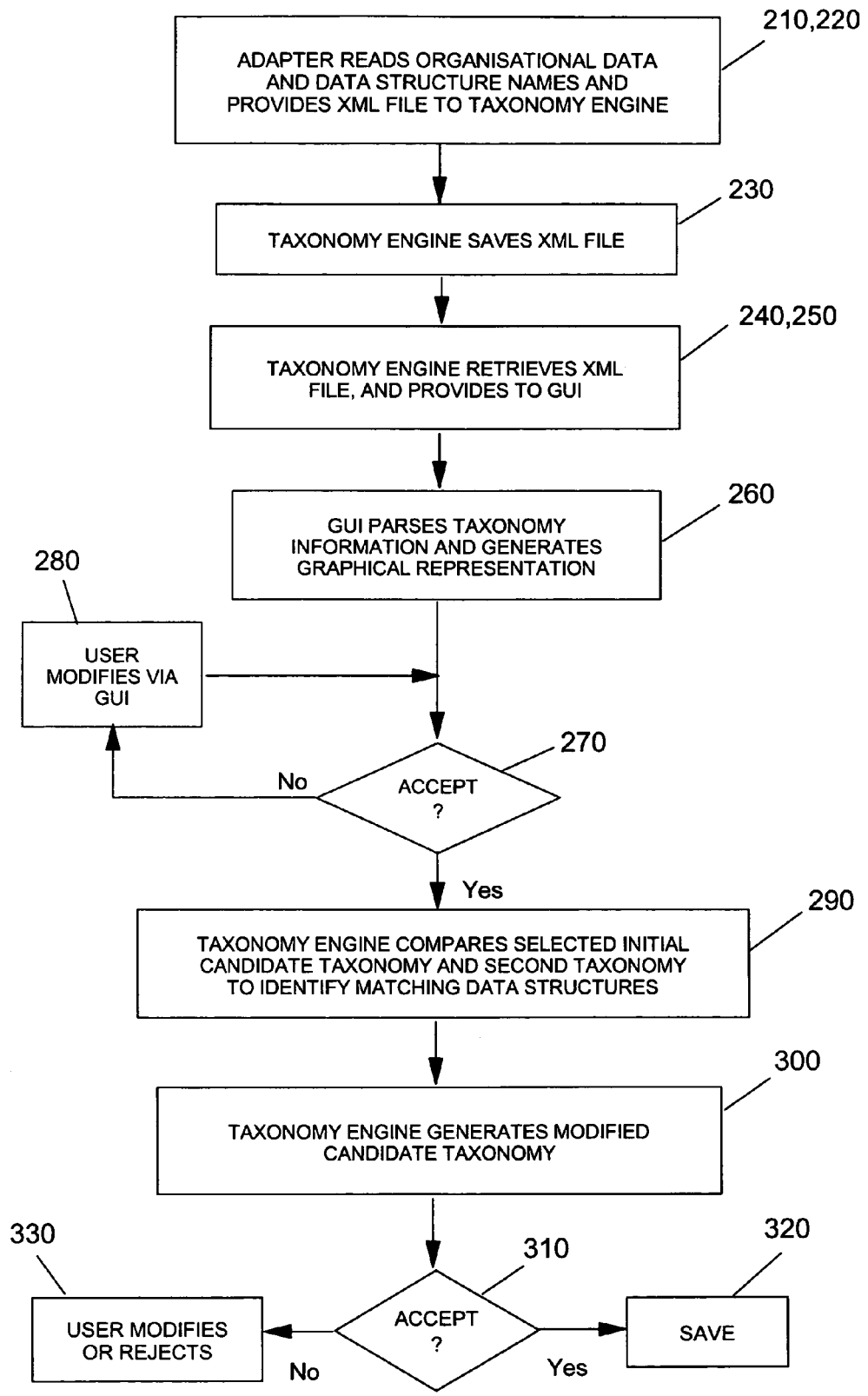
FIG. 7 shows a sequence of operational steps of a taxonomy management solution according to an embodiment of the invention.

Referring to FIGS. 6A and 7, the taxonomy engine 110 triggers 200 the adapters 120 to extract 210 organisational data for each of a set of application programs 30,40. The organisational data so extracted is passed to the taxonomy engine in a form that enables it to be manipulated in memory by the taxonomy engine 110 and displayed on the GUI 100. When an application taxonomy or reference taxonomy is to be stored, it is saved in an XML format (shown as optional step 230 in FIG. 7). Storage of application taxonomies is not essential in some cases, because each application taxonomy can be regenerated by invoking the relevant adapter. The reference taxonomy must be stored if it is to be used for subsequent processing.

An adapter 120 does not retrieve a full copy of an application's data and pass this to the taxonomy engine. Instead, only the information relating to the organisation of data within the data storage used by the application (e.g. names of files, folders and directories and their relationships within an hierarchical file system) has been retrieved 210 and passed 220 to the taxonomy engine. This avoids the duplication of large amounts of data and the significant data processing that is required by many federated systems which rely on transformation of an application's data items to a non-native format.

Taxonomy Engine

The taxonomy engine 110 receives the various organisational data from the adapters 120. Within the organisational data, each node has a name string which is unique within the set of children for a single parent node—i.e. a parent cannot have two children with the same name. Each node therefore has a unique path within the taxonomy, where the path is the fully-qualified name expressed relative to the root of the tree.

Figure 3:
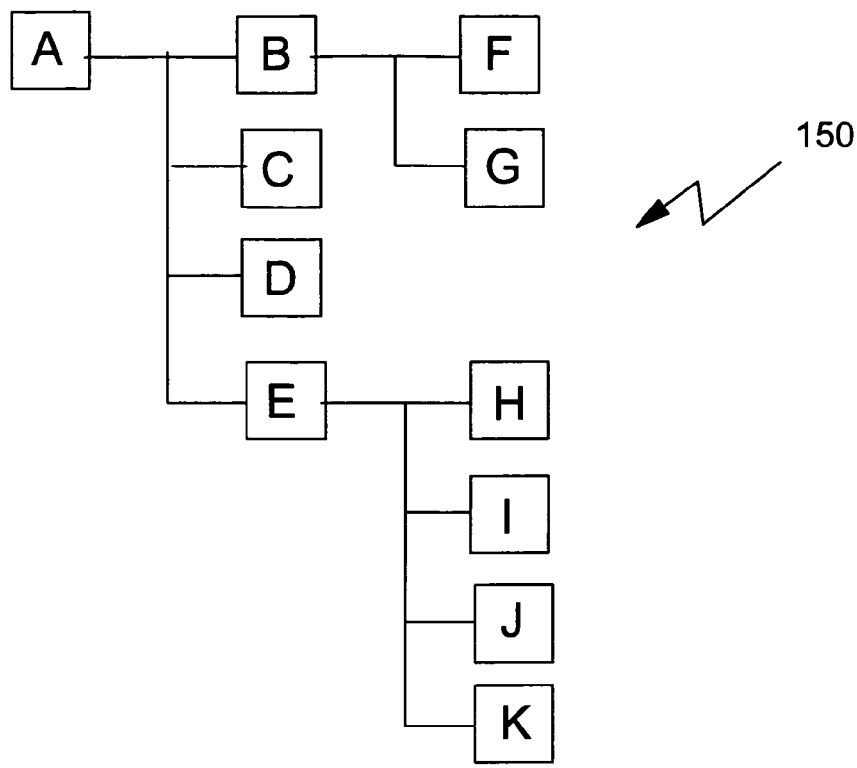
FIG. 3 shows an example hierarchical structure, corresponding to the directory/folder taxonomy of a first application.

As is well known, many programs make use of an hierarchical organisation of data. Although data may be organised in many different ways, including linked tables within a relational database or a flat (one level) array of independent files, the following description relates to the specific example of a taxonomy manager for managing the organisation of data within an hierarchical taxonomy. In the example of hierarchically organised data, the graphical representation is typically a two-dimensional hierarchical 'tree' representation (such as shown in FIG. 3). Links show relationships within the taxonomy and nodes represent specific directories, folders or files at specific levels of the taxonomy.

In the description that follows the data organisation taxonomy specific to each separate application is termed the 'application taxonomy'. The 'reference taxonomy' is the master data organisation taxonomy with which the separate application taxonomies are compared. The reference taxonomy represents the user's preference for organising his/her data on the machine.

A candidate for the reference taxonomy may be generated in one of three ways (as described below). Regardless of which of these methods is used, the user is then free to modify the candidate reference taxonomy manually to obtain the final reference taxonomy he or she desires. The user may also use some or all of the three methods. For example, the user could select one of the application taxonomies as a good starting point (method 2 below), manually modify it (method 1 below) and then compare it with some or all of the application taxonomies (method 3 below) to complete the final reference taxonomy.

The three methods of generating a candidate reference taxonomy are:

1. 'De novo': The user uses the GUI within the taxonomy manager to design a taxonomy completely from scratch by creating nodes and sub-nodes. (Note that such a taxonomy may have been supplied by someone else and distributed as an XML file.)
2. 'By selection': The user uses the GUI to examine the application taxonomies of each of the separate applications for which adapters are available. One of these taxonomies may then be selected as a candidate for the reference taxonomy.

Figure 8:
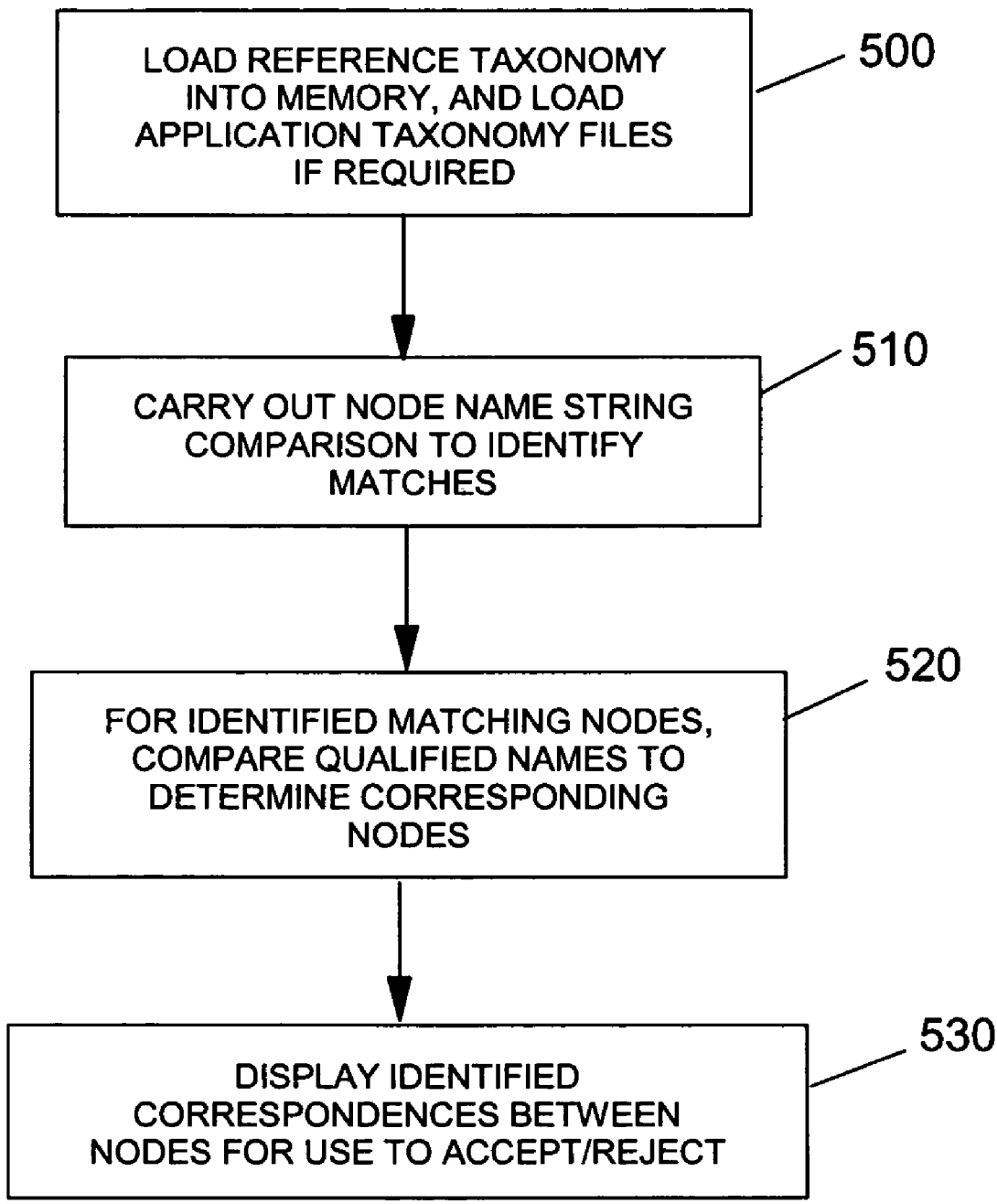
FIG. 8 shows a sequence of steps of a comparison method according to an embodiment of the invention.

When prompted by a user or by expiry of a predefined time period, the taxonomy engine 110 retrieves 240 the organisation information of a selected one of the managed programs 30,40, and provides 250 this information to the GUI 100 for display. If no such application taxonomy information was stored, the information is obtained 210 via the adapter. From the user's perspective, the retrieved or generated application taxonomy is an initial candidate taxonomy for consideration and possible modification to generate a master reference taxonomy. The taxonomy engine 110 parses the data received from the adapter or retrieved from storage to interpret the application taxonomy, and the GUI 100 generates 260 a graphical representation of the taxonomy for display to the user. The taxonomy is typically rendered as a tree-based visualization, with one or more root nodes and branches. Each node of the visual representation represents a data structure of the taxonomy. Tree-based visualizations are well known in the art, for example from the Microsoft Windows Explorer navigation pane, but conventional systems do not enable the automated (or semi-automated) extraction of organisational information for a number of different data types, followed by comparison and modification of those taxonomies. The user is able to view each of a number of application taxonomies in this way, in order to select 270 a specific one of the existing taxonomies as a suitable starting point for the creation of the reference taxonomy and to select 210-270 additional existing taxonomies to compare. Via interaction with a GUI (described below) the user is able to repeatedly modify 280 the graphically displayed taxonomy until they decide 270 that the displayed taxonomy is acceptable as a reference taxonomy.
3. 'Auto-generation': The user may ask the taxonomy manager to generate its own candidate reference taxonomy by comparing all of the application taxonomies (using the procedure described below). As described above, the taxonomy engine can compare 290 the different sets of organisation information to identify similarities and differences between them. As shown in FIG. 8, the initial comparison is implemented by reading two taxonomies into memory and using conventional character matching techniques 510 to identify matching strings of alphanumeric characters within the sets of named directories, folders, files, etc of the different XML files. A subsequent comparison step 520 uses qualified names of data structures (as described below) to identify parts of the taxonomies which appear to have corresponding node names and corresponding relationships between nodes. The comparison operation is implemented within the taxonomy engine 110 and can be initiated by the user or run automatically according to a predefined schedule to detect new bookmarks, folders and directories added since the last run.

The Taxonomy Engine can compare any application taxonomy against the reference taxonomy. This will show up similarities and differences and these relationships are remembered by the Taxonomy Engine:

Some elements may have the same name and be in an equivalent position in the application taxonomy as in the reference taxonomy. For example, the reference taxonomy and an application taxonomy might both contain a node whose path is "/computing/scientific/molecular modelling".

Additionally, a node in the application taxonomy may correspond to a node in the reference taxonomy even though they have different names or positions in the taxonomy. For example, the reference taxonomy node /news/business/ITnews might correspond with a Bookmarks folder in Netscape Navigator called /IT/press-releases. In most implementations, such a correspondence will not be identified automatically, but the user can specify a match in such cases.

Additionally there may be nodes in the application taxonomy that have no equivalent in the reference taxonomy and are unique to the application. For example, there may be an entry in the Internet Explorer's Favourites folder for "traffic information", but no corresponding node in the reference taxonomy. These application taxonomy nodes can be specified to remain outside the set of nodes managed by the Taxonomy Manager.

Additionally there may be nodes in the reference taxonomy that do not have equivalents in an application taxonomy and are irrelevant to the particular application. For example, there may be a node in the reference taxonomy for "/news/general/weather/weathermaps" but no corresponding Lotus Notes folder. The absence of a Lotus Notes folder for this subject area is remembered (within the stored form of the reference taxonomy).

Based on the comparison results, the taxonomy engine then generates 300 a new candidate reference taxonomy—in this case a taxonomy representing an aggregation of data structures and interrelationships within the two sets of organisation information. The candidate taxonomy takes account of similarities between the two sets of organisational information, firstly by representing a pair of matching nodes (one from each of the taxonomies being compared) as a single node in the reference taxonomy. The candidate reference taxonomy takes account of differences between the two sets by aggregating the hierarchical structures of the two sets so that the reference taxonomy retains a representation of the other parts of each taxonomy which do not match with the other taxonomy. The aggregation is performed subject to a confirmation of acceptance 310 by the user, and is limited by any exceptions specified by the user in advance (such as parts of a pre-existing taxonomy which are to be disregarded when generating the reference taxonomy). If accepted, the aggregated taxonomy is saved 320. If not accepted, the user may perform modifications 330 via the GUI or simply reject the aggregated taxonomy.

The taxonomy engine can iterate over each of the other application taxonomies in turn, performing simple string comparisons of the node names. This may involve accessing stored application taxonomies or generating them dynamically via the adapters. Where a match is found, this suggests an equivalence relationship—and the user is prompted to confirm or reject the suggested equivalence relationship. Where multiple nodes match by node name (alone), their paths are compared 520 by stepping back through the taxonomy information from the 'matching' node to the parent, to achieve further context. These fuller paths are compared (by string comparison) and a number of suggested equivalence relationships are presented 530 to the user. These suggested alternatives are sorted into an order according to the closeness of match between the strings (i.e. using the full context information). Once again, the user can accept or reject the suggested matches at this stage. Where a suggested equivalence is rejected by a user, a confirmation of the rejection is stored and applied to future comparisons to avoid presenting the user with a suggestion that has already been rejected.

In addition to the accepted relationships, the system enables users to specify other relationships (such as equivalence, child, parent) that the user wishes to adopt despite the absence of a match resulting from a string comparison of node names or fuller path names. These relationships can be defined by interactions with the GUI—drawing links and moving nodes—and are stored persistently. In addition to storing the reference taxonomy, together with saved accepted and rejected relationships, a history of changes to the reference taxonomy is also stored persistently.

For each node of a first taxonomy identified as matching a node of the second taxonomy, the qualified-name string matching determines whether the matching node has a matching child node and/or a matching parent node in the data repositories of both of the managed programs. If a matching node has a different set of child nodes in one program from the set identified within the other program (for example, if there are no child nodes in one program), the taxonomy engine generates an aggregated set of child nodes and links which is an aggregation of the two different sets. This step of aggregating sets of nodes and branches can be performed for all matching nodes within the two data taxonomies being compared, and typically results in an expanded tree. An example of this combining of nodes and branches is shown by example in FIGS. 3-5.

Figure 4:
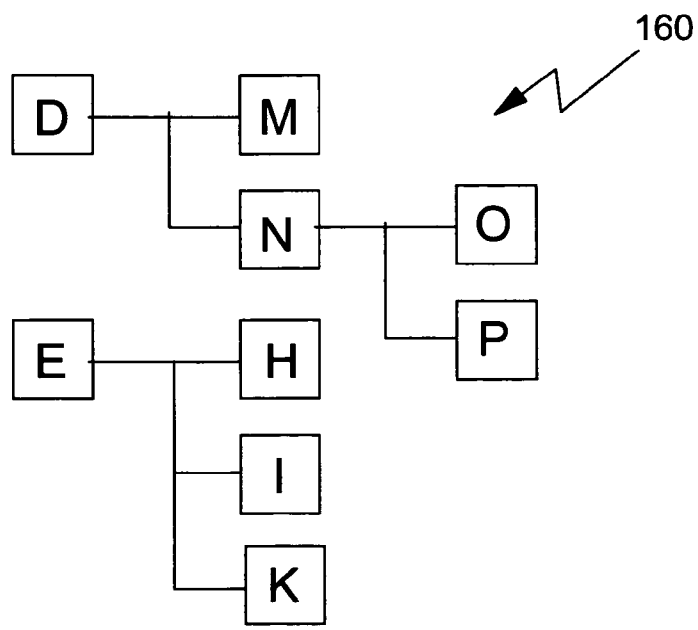
FIG. 4 shows a second example hierarchical structure, corresponding to the directory/folder taxonomy of a second application.

FIG. 3 shows an example hierarchical taxonomy 150, including a first root node A at the highest level of the taxonomy. The root node has 4 child nodes B,C,D and E. Nodes B and E each have their own respective child nodes F,G and H,I,J,K respectively. FIG. 4 represents a second data organisation 160, including two nodes $D_1$ and $E_1$ at the same level of the taxonomy. $D_1$ and $E_1$ are not identified as having a shared parent node in the data organisation represented by FIG. 4. Each of nodes $D_1$ and $E_1$ in FIG. 4 have child nodes—the child nodes $H_1$, $I_1$, and $K_1$, of node $E_1$ corresponding to a subset of the child nodes of node E in FIG. 3, but the child nodes of $D_1$, in FIG. 4 have no equivalent within FIG. 3.

Figure 5:
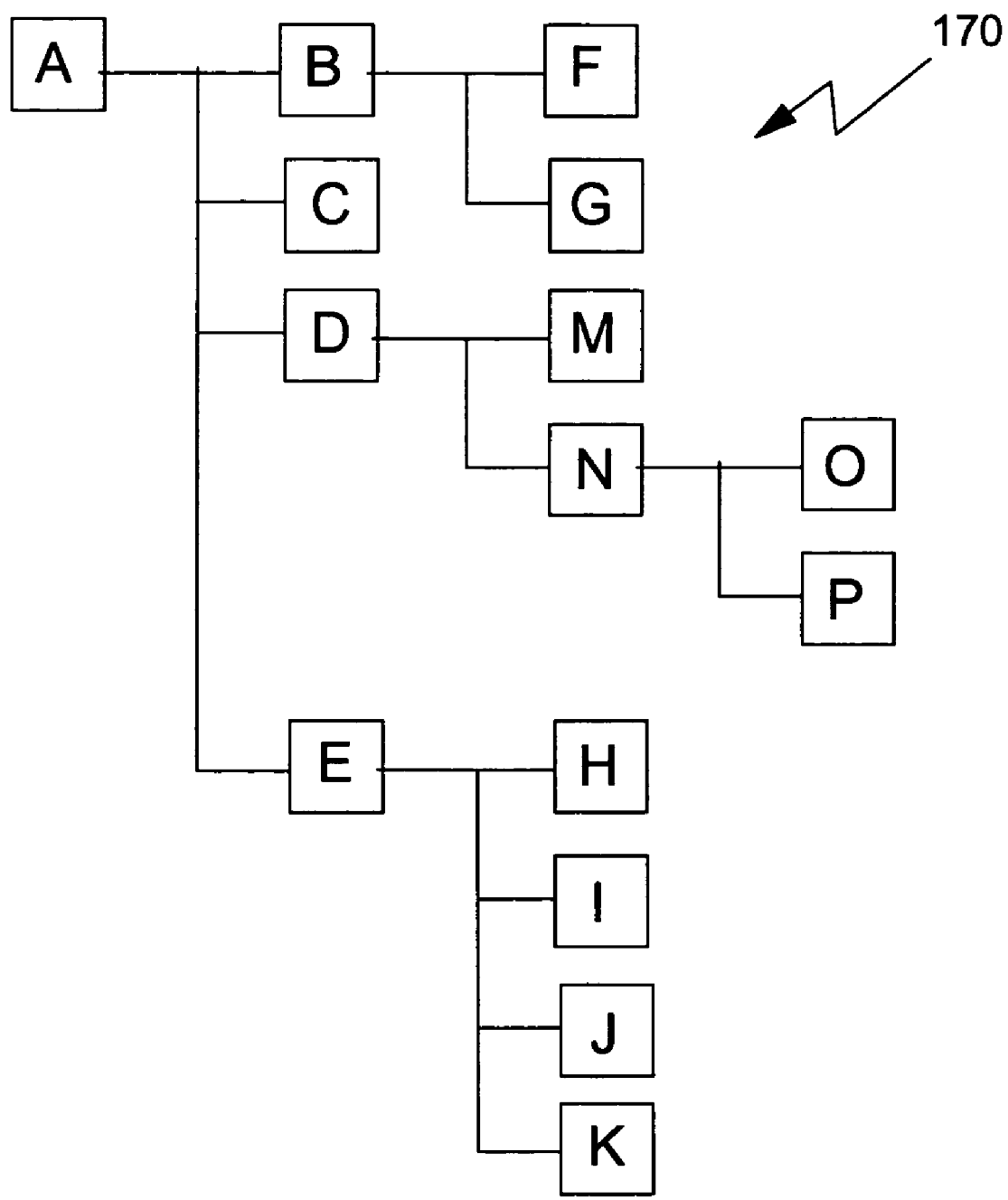
FIG. 5 shows a reference taxonomy, such as could be generated by a taxonomy management solution according to an embodiment of the invention.

FIG. 5 represents the results of a merge operation performed on the two hierarchical structures. The taxonomy 170 of FIG. 5 includes all of the nodes and links of our original FIG. 3, but has an additional branch including nodes M,N,O and P.

If a set of nodes at different levels of the taxonomy are identified as matching, the aggregate taxonomy which is generated by the merge operation includes all of the sub-trees of the two separate hierarchies overlayed on each other (unless the user specifies exceptions). Referring to FIGS. 3 and 4, a node E within a first taxonomy 150 (FIG. 3) is identified as a match for node $E_1$ within a second taxonomy 160 (FIG. 4). Some of the child nodes H,I,K of node E in the first taxonomy 150 are identified as matching child nodes $H_1$, $I_1$, $K_1$ of $E_1$ in the second taxonomy 160. An aggregated taxonomy is created in which nodes E and $E_1$ are identified as matching and represented by a single node. Similarly, H and $H_1$, I and $I_1$, and K and $K_1$ within the two separate hierarchies are identified as matching and each respective pair of matching nodes is represented by a single node in the aggregated taxonomy. In taxonomy 150, node E has an additional child node J, and this is included as a child node of E in the aggregated taxonomy.

Note that the proposed reference taxonomy is only a candidate at the time of its creation—a representation of a possible organisation of data which has not yet been applied to the data of either of the compared programs. Secondly, no attempt is being made at this stage to identify matching data content stored in association with the two data storage hierarchies—the only comparison is between the named hierarchical data structures (files, folders and directories) and their relationships (as represented by their qualified-names which specify unique paths within the taxonomy) within each of the two hierarchies corresponding to the data organisation of the two managed programs. The node labels $D_1$ and $E_1$ in FIG. 4 merely indicate that they will be identified as matches for nodes D and E in FIG. 3—the actual data within a folder labelled $D_1$ is likely to be entirely different from the data within a folder D, except that the data items may be related to a common subject area or project.

The reference taxonomy is displayed by the GUI as a candidate reference taxonomy. The user can then decide 310 whether or not the candidate reference taxonomy of FIG. 5 is a useful data structure for the two managed programs (or any one of them). If the user accepts the modified candidate taxonomy for either one or both of the programs for which organisational information is being compared, the taxonomy engine is instructed to save 320 the candidate taxonomy.

In response to an accept or save instruction, the taxonomy engine 320 generates 300 a new XML file for storage of the reference taxonomy, and saves the reference taxonomy persistently to disk. As a separate operation from saving the reference taxonomy (although not necessarily separate in alternative embodiments), the taxonomy engine deploys the reference taxonomy to whichever one or more of the managed programs the user specifies. The deployment flow is shown schematically in FIG. 6B. The separation of save and deploy allows saving of the taxonomy when partially complete, without necessarily being deployed at that time. The reference taxonomy is likely to be of most value when it can be applied to all of the programs being managed, but this is not essential. Indeed the reference taxonomy provides a useful reference even if not used to modify the taxonomies of any of the existing applications.

When applied to the data organisations of one or more applications, the taxonomy engine 110 initiates creation, renaming and moving of folders, bookmarks and directories for each of the managed programs for which the reference taxonomy was approved by the user. The taxonomy engine instructs 400 the relevant adapter 120 for an application 30 (for example, an e-mail program, operating system file system, or Web Browser), and the adapter 120 controls 410 the application 30 to create, rename or move data structures 420 to conform to the new taxonomy 170.

In particular, the taxonomy engine invokes a method in the adapter's interface and passes to the method a specification of the operation to perform together with the target node in the application taxonomy on which the operation is to be performed and additional information required for the operation. For example, a move operation would specify to the adapter the current and required paths of the node to be moved. The adapter would use these paths to, firstly, locate the corresponding data element in the application's data storage hierarchy and, secondly, to initiate a move of that data element to a new location in the hierarchy that corresponds to the required path. The actual implementation of the adapter would depend on the application type. An example would be the deletion of an element from one location in an XML bookmarks file and the insertion of an equivalent element into an alternate location in the XML file.

The result of this step is that the data organisation of one or more of the managed programs will conform to the newly generated reference taxonomy. Nevertheless, exceptions can be catered for such that the reference taxonomy aggregates selected parts of the taxonomy of multiple applications, but other selected parts are maintained application-specific and are not reflected in the taxonomies of other applications. These exceptions can be handled by requiring user-confirmation of all updates during the deployment step, but can equally be handled by an initial step in which the user selects (for example, by interaction with the graphical representation of an application taxonomy) any taxonomy features that the user wishes to exclude from the operation of the taxonomy manager. Exclusions of parts of a taxonomy can speed up operation of the taxonomy manager, and is likely to be desirable if the user only wishes to modify a small sub-tree of two application taxonomies and to retain differences for other parts of the taxonomies.

The addition of new data structures and moving of data structures can be advantageously applied to two separate applications to achieve consistency between them (i.e. the data organisation of both applications is updated with reference to the other). However, subject to the user's requirements, it may be useful to apply the reference taxonomy to only a selected one or more of the applications that were compared (i.e. features of the organisation of data within a first application are applied to a second user-selected application, without changing the data organisation of the first application). The current embodiment can achieve this effect, because the user has an option to reject the addition of any node for any application taxonomy, but in other embodiments an option for applying a reference taxonomy to only a subset of the compared taxonomies may be selected at the beginning of deployment.

An example of the result of deploying the reference taxonomy is where a reference taxonomy contains a data structure for "\personnel\compensation", which resulted from the existence of an e-mail folder of that name within the data storage structure used by an e-mail application. When the reference taxonomy is deployed to update the local file system, the absence of a file system folder named "\personnel\compensation" triggers an event to create such a folder (subject to confirmation by the user). If the user confirms the event, the adapter for the file system data storage structure is invoked to create the appropriate folder.

In a second example, a bookmark folder "news/weather" may cause a node "/weather" to be added to the reference taxonomy. Other selected applications will then have a node "/weather" added to their taxonomies (subject to confirmation by the user).

When an execution of the taxonomy manager identifies new data structures in one of the sets of organisational information being compared, a new candidate reference taxonomy is generated and the user is prompted to confirm whether the new candidate should be accepted and applied to the managed programs. If accepted, the previous saved reference taxonomy will be updated and corresponding data structures will be introduced into the application taxonomy of each managed program for which the new taxonomy was accepted.

The above description refers to periodic or user-prompted execution of the taxonomy manager. For example, synchronisation of taxonomies could be scheduled to take place once per day or once per week. In an alternative embodiment, described later, the system is configured such that the taxonomies of all of the applications that use the reference taxonomy are updated automatically in response to addition of data structures to one of the taxonomies, without reliance on a timer expiry or user-request to trigger the update of the set of applications. As described above, automated updating is implemented with the user-configurable option that updates must be confirmed by the user since many users will require this safeguard.

The user may decide that some new data structures should be kept application-private and not applied to other managed programs. Any data structure designated as application-private by the user will remain as such in future comparisons of application organisational structure unless the user explicitly requests that the status of the data structure is changed for re-inclusion.

The taxonomy engine also enables modification of the data organisation information in response to user interactions with the GUI, as described in detail below.

Graphical User Interface

The GUI interprets data feeds from the taxonomy engine and generates a graphical representation of the current taxonomy, as described above. In addition, the GUI implements drag-and-drop capabilities and other known graphical user interaction mechanisms (such as a right mouse button click or keyboard shortcut for delete)—enabling the user to add, prune, rename or move sub-trees within the taxonomy.

The user can select a node of the candidate reference taxonomy and drag it to a new location—either overlaying an existing node (see below), or at a new position in the GUI corresponding to an ancestor, sibling or descendant relationship to other nodes, or to create an independent data structure. When a parent node is moved, all descendant nodes are moved with the parent unless the user specifies an alternative action.

When the user drags a node over another they are prompted for whether this operation is a replace or a merge operation. If it is a merge, the node is given a new name with defaults being either of the existing node names. The child nodes are aggregated and the data is aggregated by the adapters if the data stored by the separate applications are stored in similar formats. Where data may be over-written the user may be prompted with dialogues for confirmation; e.g., "File conflict, which do you want me to keep?" Or, "Shall I version them?".

If it is a replace operation then the node is by default given the name of the replacing node and the content of the replaced directory (Windows Explorer for example) can optionally be deleted or retained, but if retained then the directory is no longer represented in reference taxonomy.

The user can then save the reference taxonomy that results from a set of user-controlled changes to an initial candidate reference taxonomy generated by the taxonomy manager. When saving such a resulting taxonomy, the taxonomy manager also saves a history of all changes. This provides an opportunity to replay the changes against the individual types of data that pertain to the various application programs that the user wishes to manage.

The program code implementation of GUI operations such as described above are well understood by persons skilled in the art, and so are not described herein in detail.

The features of the GUI and taxonomy engine of the taxonomy manager 60 which respond to a user's graphical interactions make it possible to use the taxonomy manager to generate a new taxonomy without necessarily starting from a comparison of two existing taxonomies. This new taxonomy could then be imposed on chosen applications, including the possibility of exporting the taxonomy to a new machine and then deploying the taxonomy there to update chosen applications on the new machine. The options for selective deployment of a reference taxonomy—including exporting to different systems—provides the possibility of a desired taxonomy being made available to all selected applications on a new system at an early stage.

Usage Scenario

As an example of a usage scenario, let us consider an experienced computer user who is developing a software product. The developer uses his Web Browser to locate information on competitive products, new technologies, analyst reviews of the marketplace, and so on. The developer marks useful pages by saving bookmarks/favourites within the Browser. The developer also sends and receives e-mails seeking and supplying information on a number of areas related to the new product, and they store the e-mails in folders within an e-mail client program. The developer also generates product specification or design documents or source code which are typically stored on the C: drive of the developer's computer, organised in directories or folders. Typically, the developer also receives documents or presentations as attachments within e-mails and detaches the attachments to save on the developer's hard disk.

The example user now has three different but loosely related information hierarchies into which different types of data have been saved. The user can work with the inconsistent set of information spaces, but the user's productivity is adversely affected by the inconsistencies—navigation is slowed down and tasks such as making a backup of all material on a particular subject or relating to a particular project are complicated.

However, reorganizing the set of different data structures to increase the consistency between them would, in the absence of any assistance, be an onerous task.

The taxonomy manager program 60 is used to examine the user's e-mail folders within a Lotus Notes database, Browser bookmarks and directory structures. The taxonomy manager program compares names of data structures within the directory structures to identify similar names. Sufficiently close similarity implies that a positive match has been found, and then the data structures are used to generate a 'reference taxonomy' as described above. The GUI presents the user with a graphical representation of the reference taxonomy, that the user might find intuitive and be able to remember.

As described above, the reference taxonomy is not necessarily an aggregate of all features of the compared taxonomies, since each addition is subject to confirmation by the user—and in some embodiments exceptions can be specified in advance of generating a candidate reference taxonomy. In the present embodiment, the 'reference taxonomy' is a taxonomy which is generated to represent an overall data organisation and the application taxonomies are each mapped onto the reference taxonomy.

Since the reference taxonomy is typically derived from hierarchies generated by the user, it is likely that the reference taxonomy will provide a reasonable representation of the user's view of data relationships. Furthermore, the GUI provides an easily viewable graphical form of the reference taxonomy which is very similar to well known application-specific folder structures. The user can then use operations provided by the GUI which allow re-organisation of the reference taxonomy to suit their preferences, or the user can indicate acceptance of the candidate reference taxonomy.

In response to the acceptance, the taxonomy manager creates, renames and moves folders, bookmarks and directories within one or both of the compared taxonomies to fit the user's accepted reference taxonomy. Where folders, bookmarks or directories are no longer needed as a result of merging or modifying the taxonomies, the taxonomy manager prompts the user for a decision regarding whether to remove unnecessary structures. No data items stored within the data structures have been deleted—instead data has been reorganised into a set of independent but consistent data structures.

The result of the above-described method is that the user is provided with a harmonised organisation of their information. When an e-mail is subsequently received with a large attachment on "The Performance Characteristics of Product1" the user decides to save the e-mail in a 'Products/Product1/Performance' mail folder. The user then decides to detach the document, and the user can do so directly into the 'C:\Products\Product1\Performance' folder on their local drive. The user should benefit from the harmonisation when subsequently needing to remember where the document was saved, because the path to the document will be similar to the folder in which the original e-mail was saved.

Distributed Management of Information Storage

Figure 9:
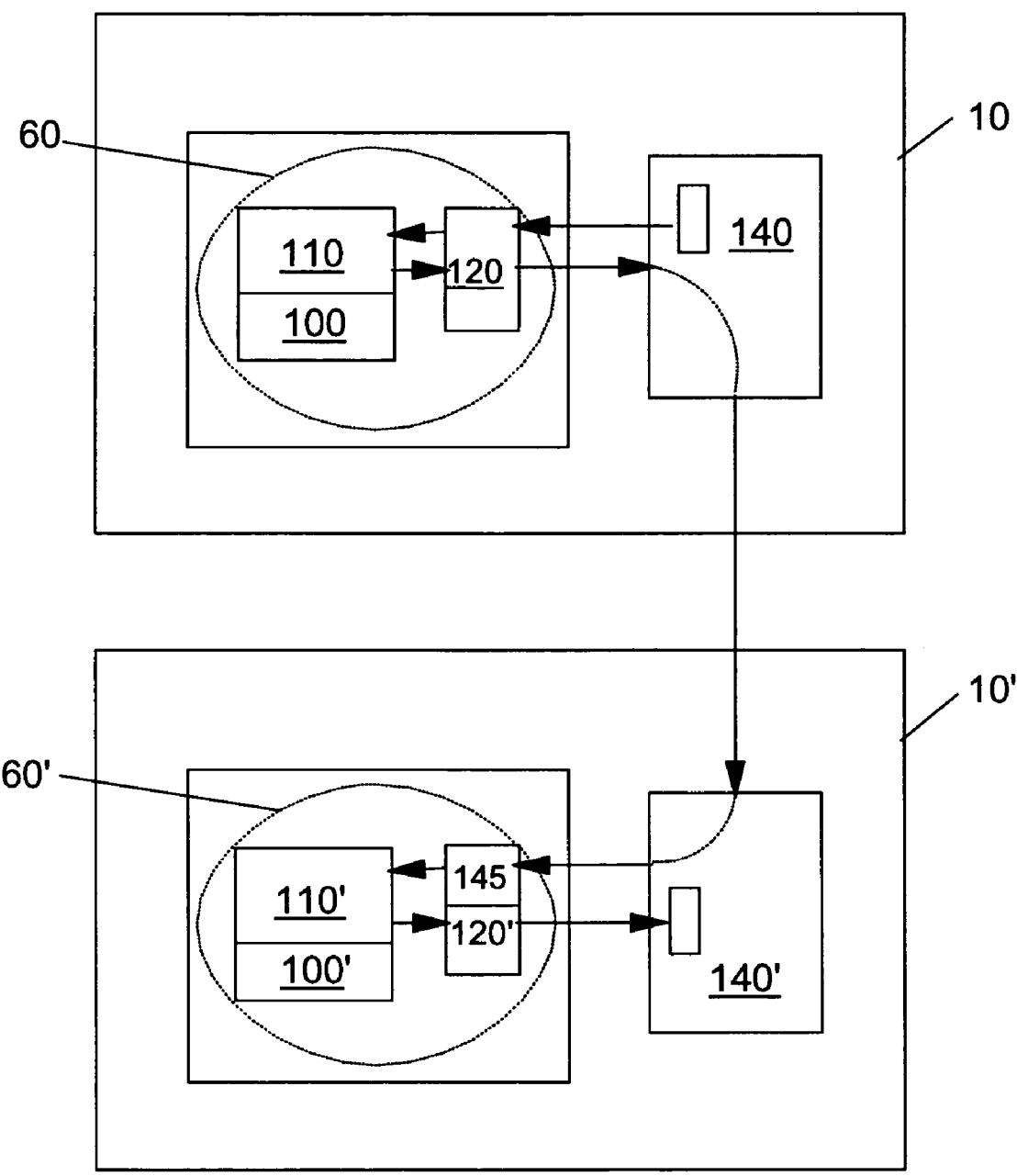
FIG. 9 is a schematic representation of two systems within a distributed network and the transfer of taxonomy information from the first to the second system.

In addition to the local use of a taxonomy manager program as described above, a taxonomy generated as an XML file by one taxonomy manager program can be communicated to other taxonomy manager programs running on different computers within a network and then applied to programs running on the different systems. This is shown schematically in FIG. 9. A first taxonomy manager 60 generates a reference taxonomy by accessing data storage of a program 140 running on the local system 10, and then communicates the reference taxonomy or part of it to a second system 10'. A taxonomy manager 60' running on the second system applies the reference taxonomy to a taxonomy of a second program 140' running on the second system. In this way, taxonomy manager programs can be used to construct synchronized or partially-synchronized information spaces in a distributed network environment.

The desire for consistency of information structures is equally valid when information is distributed across a number of different computers. For example, a set of bookmark folders on one machine can be synchronized with a similar set on a different machine when a bookmark folder is created or moved on one machine. By enabling other designated machines to be automatically updated, a user's laptop computer can be harmonized with their desktop system. A project manager can design an appropriate data organisation for use by all members of the team, and this in turn may help to associate different levels of security or different Access Control Lists with different data structures such as data directories of folders.

Messaging

The taxonomy manager 60 can be implemented as a client of a messaging system 140, and used to communicate with the other computers 10' running taxonomy manager programs 60' to provide distributed operation. To achieve this, the above-described taxonomy manager architecture is extended in two ways. Firstly, a messaging system adapter 120 is provided as a messaging client application which couples the taxonomy engine 110 to the messaging system 140. Secondly, a listener 145 is provided which receives messages from other taxonomy managers 60 across the network and inputs the messages into the receiving-end taxonomy manager 60'. The receiving taxonomy manager then effects changes in information structures on the receiving computer 10'.

The individual taxonomy managers can use point-to-point messaging or, for example at a departmental level within an organisation, can use the publish/subscribe methodology to send and receive updates to a commonly agreed taxonomy. In a publish/subscribe solution, the listener component 145 can be implemented within the adapter 120'.

For example, consider the case of a departmentally agreed hierarchical taxonomy of projects and components of those projects. Computers (users) register an interest in the synchronisation of additions or changes to any part of that component taxonomy by subscribing to the relevant topics. Any machine which makes a change to the taxonomy publishes that change on a matching topic, allowing all interested (subscribed) taxonomy manager instances to pick up the change. Access Control Lists (ACLs) of the publish/subscribe broker are used to create an authorisation environment and prevent unauthorised changes from being published.

Described above is an example use of publish/subscribe communications for propagation of taxonomy information. A further problem can be solved using the above-described architecture of a taxonomy engine, GUI and adapters. This is the problem of distributing message routing information within a network of messaging systems that use the publish/subscribe communication methodology. In this application of a taxonomy manager, the taxonomy which is to be visualized and possibly modified is the taxonomy of topic names within a publish/subscribe message broker.

Publish/subscribe messaging systems allow producers of messages to specify a "topic" to which a message relates and consumers of messages to specify sets of topics in which they have an interest. A message broker stores a set of subscriptions in the form of topic names identifying topics to which users wish to subscribe. The broker then matches interested subscribers to published messages, by matching the string of topic names of an incoming published message with the topic names in the stored subscription lists, and delivers the published messages to the relevant subscribers. The producers and consumers are typically decoupled—such that they do not know of each others' existence. Topics can be organised into tree-based hierarchies, which may allow whole sub-trees to be selected by the use of wildcards. For example, a topic taxonomy might contain a root node of "/news", which in turn contains sub-topics of "sport" & "weather". Within each of the sub-topics there could be other sub-topics, such as "hockey", "football", etc. A subscriber can express an interest in a specific topic such as "/news/sport/hockey", or in a set of topics (an area) such as "/news/sport/*", in which case they will receive all messages on sub-topics of sport.

Known examples of publish/subscribe messaging systems suitable for use with a taxonomy engine, GUI and messaging adapters as described above include IBM® Corporation's WebSphere® MQ Integrator and MQSeries® Integrator family of software products. (IBM, WebSphere and MQSeries are registered trademarks of International Business Machines Corporation.) Such publish/subscribe messaging software products implement message brokering capabilities that provide intelligent message routing and integration of applications—typically routing messages according to business rules and knowledge of different application programs' information requirements, using message topic information (as described above) which is typically contained in message headers. Although not essential to the present invention, such publish/subscribe messaging systems also typically provide the ability to transform message formats with reference to the format requirements of target applications or systems. It is also known to distribute the processing load of message brokering functions across multiple processes, machines and geographical locations using a multi-broker topology. In addition to performance improvements via load sharing, such a distributed approach can also reduce the impact of a particular server failure. Distributing publish/subscribe message broker capabilities across a network requires the communication between the brokers of updates to message routing information that result from changes of subscriptions or, in some cases, changes of publish/subscribe authorisations. A taxonomy manager can complement the existing publish/subscribe message routing capabilities of a message broker to provide an efficient mechanism for the distribution of such information between publish/subscribe messaging systems.

The taxonomy manager 60 finds out what is being published, for example by subscribing to the root topic (expensive in terms of processing overhead, since all publications would then be sent to the taxonomy manager) or by the system administrator receiving a topic catalogue from which selections can be made. The taxonomy engine is configured to subscribe to a portion of the topic space, where it matches portions of the user's local taxonomy. This matching step uses the same matching techniques and rules as described above to relate application taxonomies, and is also subject to user confirmation. There is no guarantee of correlation between a user's taxonomy and the topic taxonomy used within a publish/subscribe system. As a result, the taxonomy manager may not be able to use simple name similarity to generate "matches". In this case, the taxonomy manager either requests a topic catalogue or monitors topic strings of actual publications as mentioned above. The taxonomy manager could use this information to learn part of the structure of the actual topic taxonomy and use this taxonomy in the same way that it would use knowledge of a user's folders or bookmarks to suggest ways in which their local information might be structured.

The topic space corresponding to the stream of publications can thus be used as another source of data structures. The topic space can be compared and related to the user's overall taxonomy in the same way as described above for an e-mail application's folder structure. Therefore, the topic space can be used to influence the overall taxonomy that the user sees.

The user can define relationships between a topic sub-tree and a tree in the overall taxonomy which can then be used to drive the creation of a corresponding folder on their machine. This ability to define new relationships has the advantage of facilitating harmonisation of data organisation (enabling the user to increase the correlation between the topic taxonomy and the user's own folders etc) even in cases where there would otherwise be insufficient correlation for the taxonomy manager to identify any similarity between the global topic space and the local taxonomy. Once created, a topic-taxonomy relationship would stay in place despite changes within the sub-tree of topics below that topic in the taxonomy.

Optionally, the taxonomy manager can register subscriptions on the user's behalf due to the existence of a node in the overall taxonomy. If the user so chooses, they can subscribe to the publish/subscribe broker on a topic that is related to that specific node.

A further option is for the taxonomy program to pro-actively read the message destinations ( e.g. message queues) relating to subscriptions, and to receive saved messages into the appropriate folders. In this way, the folder structure is automatically populated with data received from the network.

Extensions Including Data Backup Extension

A generated reference taxonomy can also be used together with the taxonomy manager's GUI to enable user-initiation of operations on data structures of the application taxonomies. Examples include the data backup and data retrieval extensions described above. A particular embodiment implements user-selectable commands within the taxonomy manager's GUI. The GUI commands initiate existing functions of the application program corresponding to an application taxonomy and provide parameters indicating which data structures of the application taxonomy are to be operated on.

If one or more applications referenced by the taxonomy manager have the capability to backup their data then it can be useful to enable the user to ask the taxonomy manager to backup selected nodes (for example, by putting a tick in a checkbox next to a node in the GUI representation of the reference taxonomy). Then all applications which are capable of backing up data could back up the data in their corresponding nodes.

In this way the user is able to work with the applications through the taxonomy manager itself rather then using it merely to organise data. Since a user-selected reference taxonomy represents the organisation of data that corresponds most closely to the user's view of how data is related, a GUI representation of the reference taxonomy can provide a highly intuitive interface for the user to initiate operations on the stored data and/or data structures of a set of application programs. The taxonomy manager can similarly be extended to manage other features or behaviours (such as data compression or encryption) that apply to one or more applications.

Data Retrieval Extension

An additional application of the taxonomy manager and merged taxonomy described above is as an index for accessing data which is distributed across the set of managed applications. A single node of the reference taxonomy created using the taxonomy manager as described above may correspond to a folder in each of the individual application-specific taxonomies, and this is advantageous since the consistency of data organisation helps the user to find the set of relevant folders within the set of applications. However, data retrieval efficiency can be improved still further. A function is added to the taxonomy manager via a plug-in component interfacing between a managed program and the taxonomy engine. This enables a user who is working with data items within one of the managed programs to specify a node of the reference taxonomy for which folder contents are required. The taxonomy manager receives the request via the plug-in component from the requestor application, and sends a corresponding request to each managed application requesting them to output the contents of their folders corresponding to the specified node. An example of this is where an e-mail within an e-mail folder has a corresponding text document which has been detached to a related folder within the computer's local file system or elsewhere in the network. The user is enabled to select the e-mail and to trigger a request for retrieval of the associated document from the related file system folder.

A simple implementation of the data retrieval extension can be used to show which applications have data related to a particular node or subtree in the reference taxonomy. This provides the option to perform a targeted cross-application search for particular information. The search is launched from the taxonomy manager and scans the folders and other data structures that are represented by nodes of the reference taxonomy subtree of interest.

Summary

Thus, taxonomy manager programs can be used for visualizing and/or managing data organisation, for re-ordering data structures and generating new data structures within an overall data management structure to increase conformity between different types of program or different instances of a program distributed across a network. Taxonomy managers can be used to receive new information relating to data organisation or subscriptions, and to publish such information. Having created new relationships between data structures or subscription topics, as described above, a taxonomy manager can be used to monitor activity on a user's computer. When an item is saved in a particular folder, the taxonomy manager can publish that item to a message broker. A GUI of a generated reference taxonomy can be used as an interface for initiating operations on application program data structures.

Alternatives

The above description of one or more embodiments includes a step of parsing an application's taxonomy and extracting the organisational information and converting the organisational information into a form that can be processed by the taxonomy engine. A number of data organisations are then compared to identify similarities and differences, and a modified taxonomy is generated as a separate file. In alternative embodiments, the extracted organisational information may be stored in a format such as XML or in a format other than XML. In another alternative embodiment, the reference taxonomy may comprise meta information about relationships between nodes in different taxonomies, the meta information being stored together with the application taxonomies.

In the above description, a brief mention was made of an alternative implementation in which the user has an option of configuring the system for automated updating of the taxonomies of all of the applications that use the reference taxonomy. This is implementable as an automated triggering of the taxonomy manager in response to a modification of any one of the taxonomies. Each of the managed applications includes a function for calling the taxonomy engine, via the corresponding adapter, in response to any update to their taxonomies. The call may be a simple request to initiate the 'compare taxonomies' step described earlier, or the call may include information describing the new changes to the calling application's taxonomy. For example, if a new bookmark folder is created in a Web Browser, a corresponding folder may be added automatically to an e-mail application's taxonomy and/or an operating system file system taxonomy. Where a user has accepted an apparent match between application folders and a corresponding node within a candidate reference taxonomy, the creation of a subfolder within the reference taxonomy to maintain consistency with a new application subfolder is likely to be useful to the user. The user can configure the system to control whether and when such an update is propagated to the taxonomies of the other applications. Thus a node in an application taxonomy has an attribute that dictates whether a change to it, by its own application, is automatically reflected in the reference taxonomy at the time of the next scheduled synchronisation operation. A node in the reference taxonomy has an attribute that specifies whether a change is automatically propagated to the applications. These attributes may be specific to add, delete or move operations.

What is claimed is:

1. A method for managing data organisation for computer programs, the method including the steps of:
generating and storing a reference taxonomy, the reference taxonomy comprising information defining a user preference for data organisation;
accessing storage associated with a computer program to obtain an application taxonomy, the application taxonomy comprising information defining the organisation of stored data items of the program;
comparing the reference taxonomy with the application taxonomy to identify matching and non-matching features of the compared taxonomies; and
in response to a selection of a preferred taxonomy based on a result of the comparison, storing the preferred taxonomy as a replacement of at least one of the reference taxonomy and the application taxonomy, wherein the step of storing the preferred taxonomy in response to a selection of the preferred taxonomy includes generating a modified application taxonomy which includes features of the compared reference taxonomy, and wherein the generated reference taxonomy includes nodes representing data structures and information representing relationships between data structures, and wherein the step of generating a modified application taxonomy includes repositioning data structures within the compared application taxonomy, such as that the relationships between the data structures of the modified application taxonomy and nodes of the reference taxonomy are more consistent than the relationships between data structures of the compared application taxonomy and nodes of the reference taxonomy.

2. A method according to claim 1, wherein the steps of storing the preferred taxonomy in response to a selection of the preferred taxonomy includes:
generating a modified reference taxonomy which aggregates features of the compared reference taxonomy and features of the compared application taxonomy, wherein an identified matching feature of the compared reference and application taxonomies is represented as a single node in the modified reference taxonomy.

3. A method according to claim 1, wherein the step of generating a modified application taxonomy includes generating at least one new data structure within the modified application taxonomy which new data structure corresponds to a node of the compared reference taxonomy.

4. A method according to claim 1, wherein the step of generating a reference taxonomy includes:
accessing storage associated with a second computer program to obtain an application taxonomy for the second program.

5. A method according to claim 1, wherein a step of accessing storage to obtain an application taxonomy includes using an adapter which interfaces to the respective computer program to access information relating to names of and relationships between stored data structures.

6. A method according to claim 1, wherein the step of generating a reference taxonomy includes:
   receiving user inputs via a graphical user interface; and
   interpreting user inputs to generate nodes representing data structures of a taxonomy and to generate information representing relationships between data structures.

7. A method according to claim 1, wherein the step of comparing includes comparing, using string matching, qualified node names for nodes of the reference taxonomy and nodes, corresponding to data structures, of the application taxonomy.

8. A method according to claim 1, wherein the step of comparing the reference taxonomy with the application taxonomy is repeated in response to a trigger condition.

9. A method according to claim 8, wherein the trigger condition is expiry of a predefined time period.

10. A method according to claim 1, wherein said step of generating a reference taxonomy is performed on a first data processing apparatus and is followed by a step of sending at least a part of the reference taxonomy to a second data processing apparatus, and wherein the steps of comparing and storing a selected preferred taxonomy are performed on the second data processing apparatus.

11. A method according to claim 10, wherein the step of sending at least a part of the reference taxonomy is performed by a distributed publish/subscribe messaging system.

12. A method according to claim 1, including the steps of:
   generating, via a graphical user interface (GUI), a graphical representation of the reference taxonomy including nodes representing data structures of the taxonomy; and
   in response to user-interactions with the GUI, generating calls to the computer program to initiate application program functions.

13. A method according to claim 12, wherein the GUI includes a data backup function call and the method includes the step of:
   in response to user-selection of the data backup function call and user-selection of a set of one or more nodes of the reference taxonomy, sending a call to the application program to backup data within the application taxonomy data structures corresponding to said set of nodes.

14. A taxonomy manager for managing data organisation for computer programs, comprising:
   means for generating and storing a reference taxonomy, the reference taxonomy comprising information defining a data organisation;
   at least one adapter program for accessing storage associated with a respective computer program to obtain an application taxonomy, the application taxonomy comprising information defining the organisation of stored data items of the program;
   means for comparing the reference taxonomy with the application taxonomy to identify matching and non-matching features of the compared taxonomies; and
   means, responsive to a selection of a preferred s taxonomy based on a result of the comparison, for storing the preferred taxonomy as a replacement of at least one of the reference taxonomy and the application taxonomy, wherein the means for storing the preferred taxonomy responsive to a selection of the preferred taxonomy includes means for generating a modified application taxonomy which includes features of the compared reference taxonomy, and wherein the generated reference taxonomy includes nodes representing data structures and information representing relationships between data structures, and wherein the means for generating a modified application taxonomy includes means for repositioning data structures within the compared application taxonomy, such that the relationships between the data structures of the modified application taxonomy and nodes of the reference taxonomy are more consistent than the relationships between data structures of the compared application taxonomy and nodes of the reference taxonomy.

15. A taxonomy manager according to claim 14, including a plurality of adapters, wherein each adapter enables accessing of storage associated with a computer program of a respective type and obtaining the application taxonomy for the computer program of the respective type.

16. A taxonomy manager according to claim 14, including a graphical user interface (GUI) for generating a graphical representation of the reference taxonomy, the graphical representation including nodes representing data structures.

17. A taxonomy manager according to claim 16, wherein the GUI is responsive to user inputs to identify selection of the preferred taxonomy.

18. A taxonomy manager according to claim 16, wherein the GUI includes function calls for initiating operations of said respective computer program.

19. A taxonomy manager according to claim 18, wherein the GUI includes a data backup function call and is responsive to user-selection of the data backup function call and user-selection of a set of one or more nodes of the reference taxonomy to send a call to the respective computer program to backup data within the application taxonomy data structures corresponding to said set of nodes.

20. A taxonomy manager according to claim 14, including an adapter for interfacing between the means for generating a reference taxonomy and a publish/subscribe messaging manager to enable at least a part of the generated reference taxonomy to be sent to a second taxonomy manager via the publish/subscribe messaging manager.

21. A taxonomy manager according to claim 20, including a listener component for identifying receipt of reference taxonomy information and triggering the taxonomy manager to process such received taxonomy information.

22. A computer program stored on a computer readable storage medium for managing data organisation, comprising:
   program code for generating and storing a reference taxonomy, the reference taxonomy comprising information defining a data organisation;
   program code for accessing storage associated with a first computer program to obtain an application taxonomy, the application taxonomy comprising information defining the organisation of stored data items of the first program;
   program code for comparing the reference taxonomy with the application taxonomy to identify matching and non-matching features of the compared taxonomies; and
   program code, responsive to a selection of a preferred taxonomy, based on a result of the camparison, for storing the preferred taxonomy as a replacement of at least one of the reference taxonomy and the application taxonomy, wherein the program code for storing the preferred taxonomy responsive to a selection of the preferred taxonomy includes program code for generating a modified application taxonomy which includes features of the compared reference taxonomy, and wherein the generated reference taxonomy includes nodes representing data structures and information representing relationships between data structures, and wherein the program code for generating a modified application taxonomy includes program code for repositioning data structures within the compared application taxonomy, such that the relationships between the data structures of the modified application taxonomy and nodes of the reference taxonomy are more consistent than the relationships between data structures of the compared application taxonomy and nodes of the reference taxonomy.

23. A computer program stored on a computer readable storage medium according to claim 22, including a graphical user interface for displaying taxonomies to a user and for responding to user inputs to identify selection of the preferred taxonomy.

24. A data processing apparatus including: a data processor; data storage; one or more computer programs for controlling the operation of the data processor to perform operations on data items stored in the data storage; and a taxonomy manager for managing organisation of stored data in association with the one or more computer programs, the taxonomy manager including:

means for generating and storing a reference taxonomy, the reference taxonomy comprising information defining a data organisation;

an adapter for accessing storage associated with a computer program to obtain an application taxonomy, the application taxonomy comprising information defining the organisation of stored data items of the program;

means for comparing the reference taxonomy with the application taxonomy to identify matching and non-matching features of the compared taxonomies; and means, responsive to a selection of a preferred taxonomy based on a result of the comparison, for storing the preferred taxonomy as a replacement of at least one of the reference taxonomy and the application taxonomy, wherein the means for storing the preferred taxonomy responsive to a selection of the preferred taxonomy includes means for generating a modified application taxonomy which includes features of the compared reference taxonomy, and wherein the generated reference taxonomy includes nodes representing data structures and information representing relationships between data structures, and wherein the means for generating a modified application taxonomy includes means for repositioning data structures within the compared application taxonomy, such that the relationships between the data structures of the modified application taxonomy and nodes of the reference taxonomy are more consistent than the relationships between data structures of the compared application taxonomy and nodes of the reference taxonomy.

* * * * *

UNITED STATES PATENT AND TRADEMARK OFFICE
CERTIFICATE OF CORRECTION

PATENT NO. : 7,627,583 B2  Page 1 of 1
APPLICATION NO. : 10/697895
DATED : December 1, 2009
INVENTOR(S) : Carter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this

Second Day of November, 2010

David J. Kappos
*Director of the United States Patent and Trademark Office*